US 008423581 B2

(12) United States Patent
Hazlewood et al.

(10) Patent No.: US 8,423,581 B2
(45) Date of Patent: Apr. 16, 2013

(54) PROXY SUPPORT FOR SPECIAL SUBTREE ENTRIES IN A DIRECTORY INFORMATION TREE USING ATTRIBUTE RULES (75) Inventors: Kristin Marie Hazlewood, Austin, TX (US); John Mark McConaughy, Austin, TX (US); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 12/575,056

(22) Filed: Oct. 7, 2009

(65) Prior Publication Data
US 2011/0082879 A1  Apr. 7, 2011

(51) Int. Cl.
G06F 17/30  (2006.01)

(52) U.S. Cl.
USPC ............ 707/802; 707/812; 709/217; 709/219

(58) Field of Classification Search ........... 707/999.103, 707/802, 809, 812
See application file for complete search history.

(56) References Cited

U.S. PATENT DOCUMENTS

| | | | |
|---|---|---|---|
| 6,377,991 B1 | 4/2002 | Smith et al. | |
| 6,405,219 B2 | 6/2002 | Saether et al. | |
| 6,408,306 B1 * | 6/2002 | Byrne et al. | 1/1 |
| 6,715,128 B1 * | 3/2004 | Hirashima et al. | 715/209 |
| 6,785,686 B2 * | 8/2004 | Boreham et al. | 1/1 |
| 7,039,668 B2 | 5/2006 | Miyamoto | |
| 7,133,833 B1 | 11/2006 | Chone et al. | |
| 7,313,598 B1 | 12/2007 | Sheth | |
| 2008/0126438 A1 | 5/2008 | Rowley | |
| 2008/0140618 A1 * | 6/2008 | Kumar | 707/3 |
| 2008/0189256 A1 | 8/2008 | Kumar | |

FOREIGN PATENT DOCUMENTS

CN  1545047 A  11/2004

OTHER PUBLICATIONS

"A method to maximize the LDAP serveer search capacity by extra replica for real-time update operations and affected search operations", IBM Technical Disclosure, Dec. 28, 2007, pp. 1-3.
"LDAP Replication Templates", IBM Technical Disclosure, Jul. 22, 2008, pp. 1.
Zhou et al., "A Dynamic Metadata Equipotent Subtree partition Policy for Mass Storage System", Proceedings of the 2007 Japan-China Joint Workshop on Frontier of Computer Science and Technology, 2007, pp. 29-34.
Zeilenga et al., The Lightweight Directory Access Protocol (LDAP) Content Synchronization Operation (RFC4533), Jun. 1, 2006, Technical Disclosure, pp. 1-32.

* cited by examiner

Primary Examiner — Monica Pyo
(74) Attorney, Agent, or Firm — Yee & Associates, P.C.; Jeffrey S. LaBaw (57) ABSTRACT A mechanism for providing proxy support for special subtree entries in a directory information tree by defining filters at the proxy level to indicate relationships between main subtree entries and associated special subtree entries. A proxy server receives a request from a client for a special subtree entry and determines whether the distinguished name of the main subtree entry can be built using information in the request and pre-defined relationships between the main subtree entry and the requested subtree entry. If so, the proxy server builds the distinguished name of the main subtree entry associated with the special subtree entry and applies a partitioning filter to the distinguished name of the main subtree entry to determine a target directory server in the plurality of backend directory servers that comprise the special subtree. The proxy server then sends the request to the target directory server.

20 Claims, 4 Drawing Sheets

PROXY SUPPORT FOR SPECIAL SUBTREE ENTRIES IN A DIRECTORY INFORMATION TREE USING ATTRIBUTE RULES

BACKGROUND

1. Field

The embodiments of the disclosure relate generally to distributed directory environments, and more specifically to providing proxy support for special subtree entries in a directory information tree by defining filters at the proxy level to indicate relationships between main subtree entries and associated special subtree entries.

2. Description of the Related Art

A directory is a special type of database for managing information about people, organizations, data processing systems, and other information sources. Information within a directory is organized within a hierarchical namespace called the directory information tree (DIT). Each entry in the directory information tree is a named object and consists of a set of attributes, and each attribute has a defined attribute type and one or more values. Each entry is identified by an unambiguous distinguished name (DN) comprising a sequence of selected attribute-value pairs (relative distinguished names (RDN)) of an entry separated by commas. Entries are arranged within the directory information tree based on their distinguished names. For instance, each relative distinguished name in a distinguished name entry corresponds to a branch in the directory information tree leading from the root of the tree to the entry.

A directory service provides a mechanism for searching a directory and for retrieving information from a directory. Directory services serve as a central repository for searching, adding, deleting and modifying data. Example methods of accessing directory services in a computer network include X.500 and Lightweight Directory Access Protocol (LDAP), among others. Lightweight Directory Access Protocol (LDAP) is a software protocol for enabling a user to locate organizations, individuals, and other resources such as files and devices in a network, whether on the Internet or on a corporate Intranet. LDAP is a "lightweight" version of Directory Access Protocol (DAP), which is part of X.500, a standard for directory services in a network.

A directory may be distributed among many servers. In a distributed directory environment, data is partitioned across multiple directory servers, also known as backend servers. Distributed directory environments may include one or more backend servers and a proxy server that acts as an intermediate agent between a client and the distributed directory environment. Clients bind to the proxy server instead of directly binding to the backend servers.

SUMMARY

The illustrative embodiments provide a computer implemented method, apparatus, and computer program product for providing proxy support for special subtree entries in a directory information tree by defining filters at the proxy level to indicate relationships between main subtree entries and associated special subtree entries. A proxy server receives a request from a client for a special subtree entry, wherein the special subtree entry is stored in one of a plurality of backend directory servers in the distributed directory environment. The proxy server retrieves a partitioning filter associated with the requested special subtree entry and determines whether the request comprises a distinguished name control, wherein the control specifies the distinguished name of a main subtree entry associated with the special subtree entry. If the request does not comprise a distinguished name control, the proxy server builds the distinguished name of the main subtree entry associated with the special subtree entry and applies the partitioning filter to the distinguished name of the main subtree entry to determine a target directory server in the plurality of backend directory servers that comprise the special subtree. The proxy server then sends the request to the target directory server.

DETAILED DESCRIPTION

As will be appreciated by one skilled in the art, the embodiments of the disclosure may be embodied as a system, method or computer program product. Accordingly, the embodiments in the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments in the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments of the disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
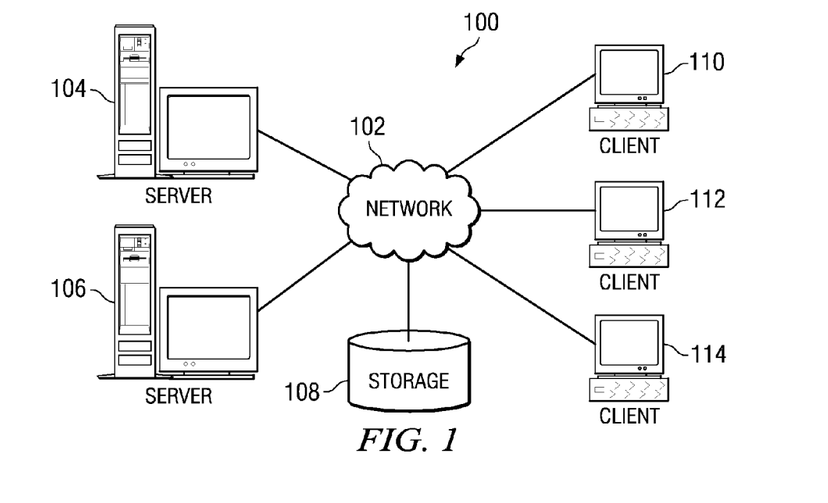
FIG. 1 depicts a pictorial representation of a distributed data processing system in which the illustrative embodiments may be implemented.
Figure 2:
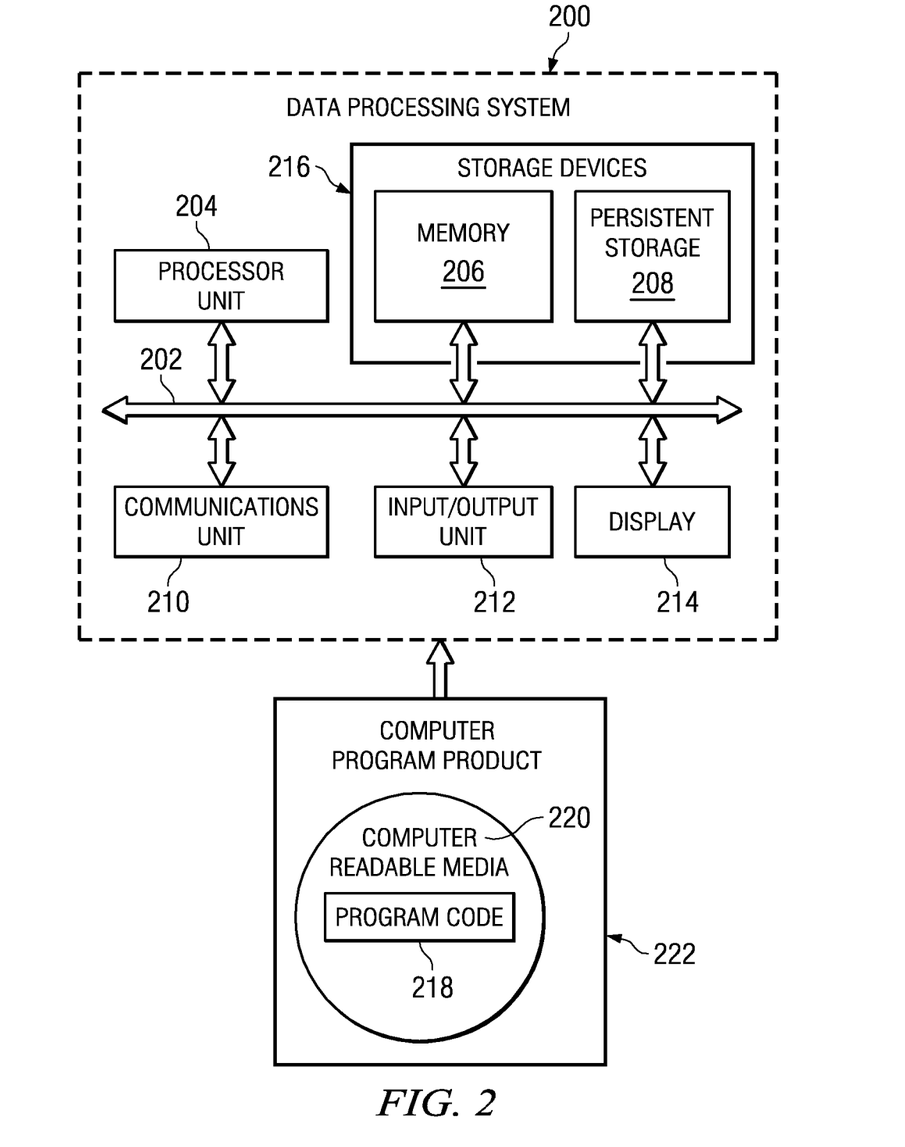
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Existing directory server environments supporting the partitioning of data across multiple directory servers typically use partitioning filters that are very basic, such as using a single filter per partition or directory server. In one example, a filter may comprise a partitioning function for hashing a portion of the relative distinguished name values at a single level of the distinguished name of a directory entry. For example, entries comprising a common name (cn), an organization name (o), and a country name (c), data under the main directory subtree o=ibm,c=us may be split across directory servers based on a hash of the relative distinguished names at the level immediately following the main directory subtree. Thus, for an entry such as cn=John,o=ibm,c=us, the partitioning filters may hash the relative distinguished name value of "John" to determine at which directory server the entry will be stored. The proxy server uses the hashed value of the relative distinguished names as a directory index to indicate the directory server that will hold each entry.

While existing partitioning filters provide an effective way to achieve an even distribution of main subtree data across the directory servers, the directory servers also store special subtree data associated with the main subtree data. Main subtree data comprises directory entries that are the active data used by the directory server. Special subtree data comprises entries created at the directory servers as a result of changes made to the entries in the main subtree. The special subtree entries reflect and log these modifications of the main subtree data.

In existing proxy environments, there is currently no way to efficiently locate entries in the special subtrees of the directory. Directory operations such as ldapdelete, ldap-modify, and ldapcompare contain the full distinguished name of the target entry, which enables the proxy server to determine the directory server in which the target entry is stored. These operations may be performed efficiently against a main subtree directory by hashing the distinguished name to locate the target directory server in which the target entry resides. However, the distinguished names in existing special subtrees do not follow the same partitioning filters in the main subtrees. Consequently, the inclusion of the distinguished name of the main subtree in the request does not hold the key for locating a special subtree entry associated with the main subtree entry. In other words, when the proxy server receives a request (e.g., search request, update request, etc.) for a special subtree entry, the proxy server will not know which directory server contains the entry. The proxy server looks at the defined partitioning scheme for the special subtree operations and determines that the partitioning scheme is not distinguished name based. As the proxy server does not know to which particular directory server to send the request, the proxy server must search each backend directory server to locate the specific entry or set of entries.

The embodiments of the disclosure allow for locating a special subtree entry by providing a new set of partitioning filters at the proxy level that utilize relationships defined between the original main subtrees and special subtrees in the directory tree. When a request for a special subtree entry is received from a client, the proxy server may not know the particular directory server that contains the requested special subtree entry. The new partitioning filters allow the proxy server to use the information provided in the request to determine, from the defined relationships, the distinguished name of the main subtree entry associated with the requested special subtree entry. The proxy server may then use a partitioning function to hash the distinguished name of the main subtree to locate the target directory server that contains the main subtree entry, which will also contain the requested special subtree. In this manner, the proxy server may search a specific target directory server for the desired special subtree, rather than searching all of the directory servers for the desired special subtree.

Figure 3:
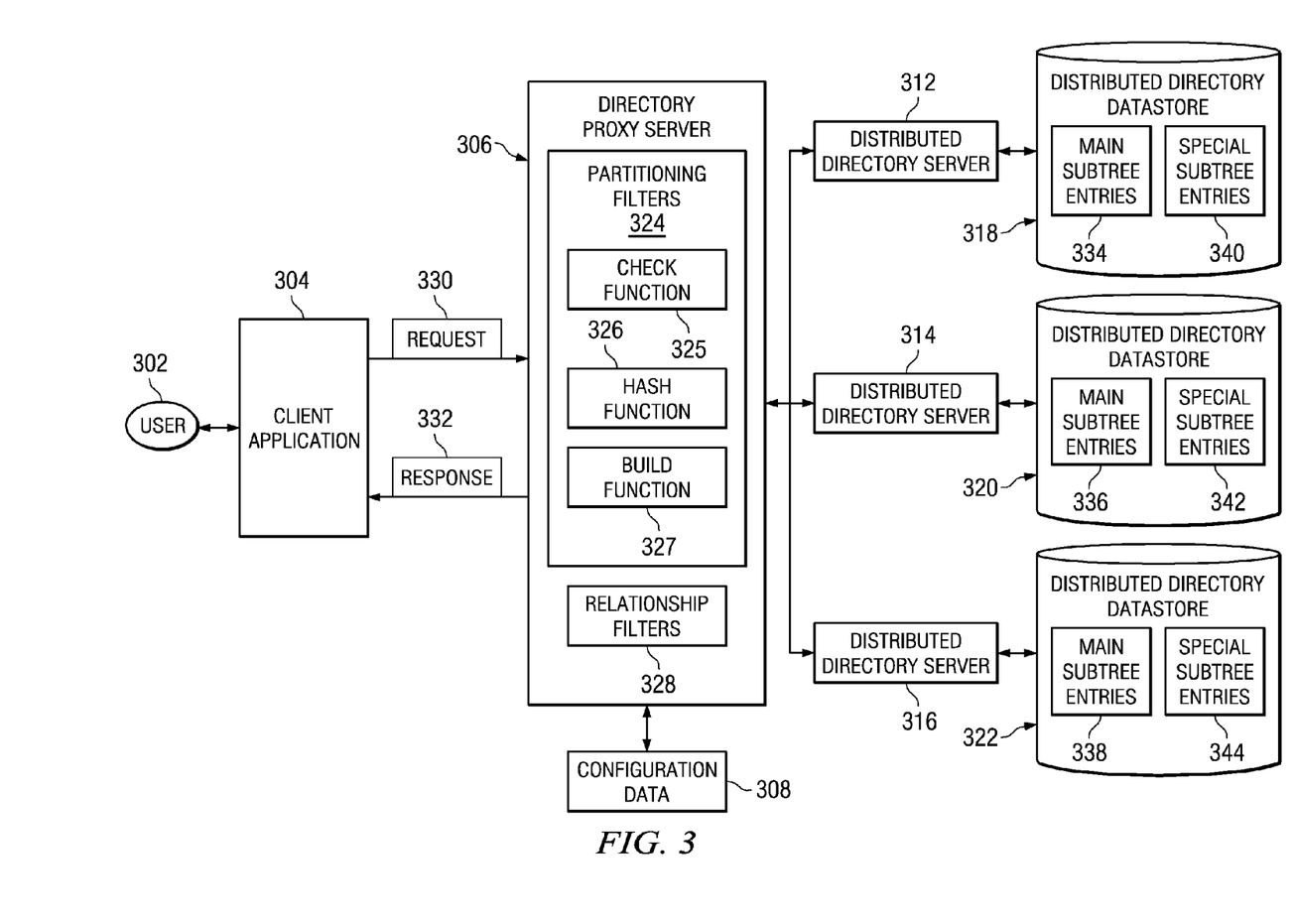
FIG. 3 depicts a block diagram that shows a distributed directory environment in which the illustrative embodiments may be implemented.

With reference now to FIG. 3, a block diagram depicts a distributed directory environment in which the illustrative embodiments may be implemented. User 302 operates client application 304, which may execute on a client device such as client 110 shown in FIG. 1. Client application 304 interacts with directory servers through a proxied directory server, also known as a directory proxy server or a proxy directory server, which is shown as proxy server 306. Proxy server 306 may execute on the user's client device or elsewhere within a network of connected devices, such as those shown in FIG. 1. Proxy server 306 may be associated with configuration data 308 that contains information managed via an administrative user application to control the functionality of proxy server 306.

Proxy server 306 acts as an intermediate agent (an "intermediary") to the distributed directory environment. Although only one proxy server is shown, there may be multiple such proxy servers or proxy server instances running on one or more physical machines. Proxy server 306 is able to perform operations in accordance with a variety of directory schemes and protocols.

The distributed directory environment includes multiple directory servers 312-316 that interoperate within the same distributed data processing environment as proxy server 306 and client application 304, e.g., in a manner similar to the distributed data processing environment shown in FIG. 1. Directory servers 312-316 support functionality for accessing datastores that contain portions of a distributed directory, i.e., portions of a directory information tree, shown as distributed directory datastores 318-322. Distributed directory datastores may comprise main subtree entries 334-338 and associated special subtree entries 340-344. A typical directory datastore is a relational database management (RDBM) server.

Data entries that are of interest to a particular directory operation may reside in different portions of a distributed directory that are supported on different systems. Thus, a distributed directory is a directory environment in which data is partitioned across multiple directory servers. As illustrated in FIG. 3, the distributed directory typically comprises a collection of machines including relational database management (RDBM) servers holding data, and one or more proxy servers managing the topology. A representative proxy server may be an IBM® Tivoli® Directory Server that provides, among other functions, request routing, load balancing, failover, distributed authentication and support for distributed/membership groups and partitioning of containers. IBM and Tivoli are trademarks of IBM Corporation in the United States, other countries, or both. As described above, the directory proxy server sits at the front-end of a distributed directory and provides efficient routing of user requests thereby improving performance, and providing a unified directory view to the client. The proxy server also provides data support for groups and access control lists (ACLs) that are not affected by partitioning, and support for partitioning of flat namespaces.

Proxy server 306 supports partitioning using partitioning filters 324 for distributing main subtree data across distributed directory datastores 318-322. In this illustrative example, partitioning filters 324 include hash function 326. Hash function 326 is applied to the relative distinguished name of a main subtree entry at a specific level of the distinguished name. For example, for the directory entry cn=Joe, o=ibm,c=us, hash function 326 may be applied to relative distinguished name value "cn=Joe" for the main subtree o=ibm,c=us. Proxy server 306 then assigns an index value to the entry based on the resulting hash value. The index value of an entry is used to determine the directory datastore in which the entry will be stored.

Special subtree data in distributed directory datastores 318-322 comprises directory entries that represent changes made to entries in the main subtrees. When any client or proxy server 306 issues a modification request to a main subtree entry in a directory server, the directory server may create a special subtree entry associated with the main subtree entry at the directory server. The system administrator then configures the special relationship filter into proxy server 306 by defining the relationship between the distinguished name of the main subtree entry and the distinguished name of the newly created special subtree entry in relationship filters 328. Examples of special subtree entries include, but are not limited to, changelog subtrees or tombstone subtrees. A changelog subtree is a subtree used to record changes made to the directory server. A tombstone subtree is a subtree used to record deleted entries. For example, a directory entry cn=Joe, o=ibm,c=us is stored in the main subtree o=ibm,c=us. If a modification is made to this entry, the directory server that contains the entry creates a new entry that represents the change made. This new entry, or special subtree entry, is assigned a new distinguished name that does not follow the partitioning filters of the main subtree. For instance, the changelog entry may be assigned a new distinguished name of changenumber=1,cn=changelog, where the special subtree is "changelog" and the entry number in the changelog is "1".

The changelog entry is also assigned a target distinguished name (targetDN) comprising the distinguished name of the associated main subtree entry. The new changelog entry is stored in the same directory server as the associated main subtree entry. In another example, if the main subtree entry cn=Joe,o=ibm,c=us is deleted from the directory, the entry is moved from the main subtree to the tombstone subtree and assigned a new distinguished name (e.g., cn=deleted objects). The tombstone entry is also assigned a target distinguished name comprising the distinguished name of the original main subtree entry. The new tombstone entry is also stored in the same directory server of its associated main subtree entry.

Relationship filters 328 define the relationships between a main subtree entry and a special subtree entry created as a result of a modification made to that main subtree entry. Relationships are defined to enable a proxy server to locate a requested special subtree in a particular target directory server, rather than having to search all of the directory servers for the special subtree. Relationships may be defined based on known associations between the distinguished name of a main subtree entry and the distinguished name of a related special subtree entry, or known associations between the distinguished name of a main subtree entry and an attribute of the special subtree entry.

Partitioning functions in partitioning filters 324 use the relationship filters to determine the target directory server that contains the special subtree specified in the request. For instance, client application 304 sends a request 330 to proxy server 306 that requests a special subtree entry in the directory. Request 330 comprises a base distinguished name and a search filter. A base distinguished name may comprise all or any portion of the distinguished name of a special subtree entry. The search filter may comprise any portion of the distinguished name of the associated main subtree entry. For example, request 330 may comprise a base distinguished name cn=changelog and a search filter cn=Joe,o=ibm,c=us.

Checking function 325 in partitioning filters 324 is used to examine the information provided in request 330 and determine if sufficient information was provided in request 330 to determine the distinguished name of the main subtree entry associated with the requested special subtree entry. In particular, checking function 325 determines if the information in request 330 and the relationships defined in relationship filters 328 comprise enough data to enable build function 327 in partitioning filters 324 to build the distinguished name of the main subtree entry. For example, a checking function for the changelog subtree may be implemented for a modify, add, compare, or delete request to first check whether or not a distinguished name control comprising the distinguished name of the main subtree entry is present in the request. Use of the distinguished name control in request 330 provides the distinguished name of the main subtree entry associated with the requested special subtree entry to proxy server 306, such that proxy server 306 does not need to build the distinguished name. Thus, if no such distinguished name control is present, checking function 325 checks whether the request comprises a search filter that specifies at least a portion of the distinguished name of a main subtree entry. If the search filter contains at least a portion of the distinguished name of a main subtree entry, build function 327 enables proxy server 306 to use the relationships defined between main subtree entries and special subtree entries to locate the special subtree associated with the distinguished name of the main subtree entry specified in the search filter. As the special subtree associated with the distinguished name of the main subtree entry in the search filter is stored in the same directory server as the related main subtree entry, proxy server 306 now knows the particular target directory server that contains the desired special subtree.

Build function 327 also enables proxy server 306 to optionally create a new target distinguished name or a new search filter for the special subtree entry depending upon the relationship defined between the special subtree entry and the related main subtree entry. While the partitioning filters 324 allow proxy server 306 to determine the target directory server on which the requested special subtree entry resides, a new target distinguished name or a new search filter allows proxy server 306 to perform a directed search and retrieve/fetch the special subtree entry from the target directory server. A new target distinguished name may be created when there is a relationship between distinguished name of the main subtree entry and the distinguished name of the special subtree entry defined in relationship filters 328. For example, when a tombstone entry is created, the distinguished name assigned to the tombstone subtree entry comprises a combination of a portion of the distinguished name of the associated main subtree entry and the distinguished name of the deleted entry's parent. The new target distinguished name for the requested tombstone subtree entry may be determined by applying the known relationship function to the distinguished name of the main subtree entry in the search filter in the request. Similarly, a new search filter may be created when there is a relationship between the distinguished name of the main subtree entry (DN) and an attribute of a special subtree entry (targetDN) in relationship filters 328. For example, for a changelog operation, the new search filter may comprise the distinguished name of the main subtree entry that is "anded" with the original search filter, such as "targetDN=<originalDN>&&original search filter".

Partitioning filters 324 may be used to process the distinguished name of the main subtree entry (i.e., hash the relative distinguished name) to determine the target directory server in which the main subtree entry, which is the same directory server in which the associated special subtree entry, is stored. If relationship filters 328 contain sufficient data to enable proxy server 306 to build the distinguished name of the associated main subtree entry, proxy server 306 may build the distinguished name and plug the distinguished name into hash function 326 to determine the target directory server of the main subtree entry. Partitioning filters 324 return the target directory server associated with the distinguished name of the main subtree entry. Relationship filters 328 are then used to determine the distinguished name of the special subtree entry (e.g., changenumber=1,cn=changelog) associated with the distinguished name of the main subtree entry. Proxy server 306 may then update the request with the distinguished name of the special subtree entry and send the request to the target directory server containing the special subtree. The target directory server returns the requested special subtree entry in a response to proxy server 306, which forwards the response 332 to client application 304.

Relationship filters 328 may comprise any rules or combination of rules that allow the proxy server to determine or rebuild the distinguished name of the main subtree entry from the information provided in request 330. In a specific example of a changelog operation, a relationship filter may comprise a simple distinguished name to attribute mapping, or DN=targetDN. In this case, a special subtree entry search comprising the distinguished name cn=changelog and a targetDN (e.g., cn=Joe,o=ibm,c=us) contains sufficient information to allow proxy server 306 to use this relationship filter to rebuild the distinguished name of the main subtree entry (e.g., DN=targetDN, where targetDN=cn=Joe,o=ibm,c=us), and therefore determine the target directory server in which the special subtree entry resides. For a tombstone operation, the relationship filter may comprise a distinguished name with a portion of the relative distinguished name appended to the last known parent attribute of the original distinguished name, or DN=(RDN−'\0')+lastKnownParent (indicating to take the portion of the RDN until the \0 character, then append the lastKnownParent attribute to create the distinguished name). In this example, a special subtree entry search comprising the distinguished name cn=deleted objects and search filter (&&(dn=cn=Joe\0*)(lastKnownParent=o=ibm,c=us) contains sufficient information to allow proxy server 306 to use this relationship filter to build the distinguished name of the main subtree entry (e.g., DN=cn=Joe,o=ibm,c=us). With relationship filters, proxy server 306 may use the information supplied on a specific LDAP request to form the distinguished name of the associated main subtree entry to plug into the defined hash function 326 to determine the target directory server in which the special subtree entry resides.

In one embodiment, if client application 304 knows the distinguished name of the main subtree entry, client application 304 may supply the distinguished name in the form of a new control. This LDAP control contains the distinguished name of the main subtree entry. When proxy server 306 receives a request comprising such a control, proxy server 306 applies partitioning filters 324 to the distinguished name asserted in the control to locate the target directory server containing the main subtree entry, which thereby locates the target directory server containing the requested special subtree entry. For example, to delete a changelog entry associated with main subtree entry cn=Joe,o=ibm,c=us, the following request is made ldapdelete "changenumber=1, cn=changelog" with a control (originalDN=cn=Joe,o=ibm, c=us). Proxy server 306 may use the information in the control to locate the target directory server to route the request. If client application 304 does not have the distinguished name information of the main subtree entry to supply in the control and cannot rebuild the distinguished name of the main subtree entry from the information in the request and the relationship filters to locate the target directory server, proxy server 306 resorts to existing methods of having to locate the special subtree entry by sending the request to all of the directory servers.

Figure 4:
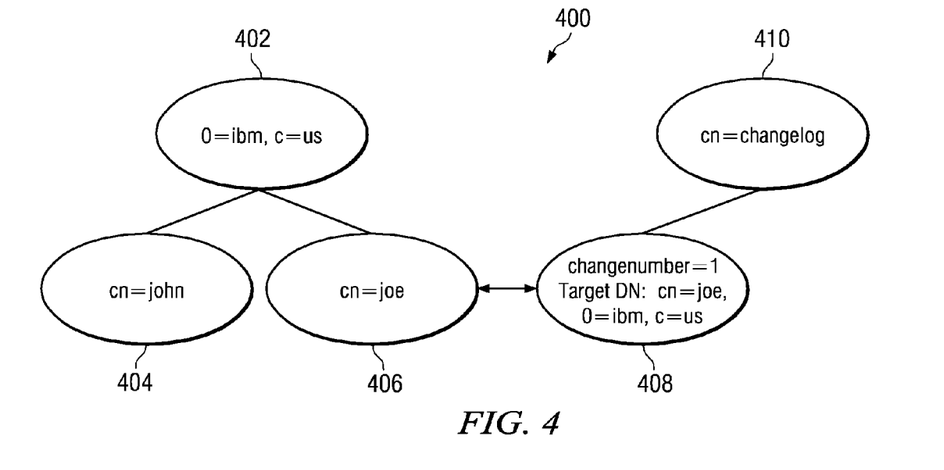
FIG. 4 illustrates an exemplary LDAP directory tree comprising a main subtree and an associated special subtree in accordance with the illustrative embodiments.

FIG. 4 illustrates an exemplary LDAP directory tree comprising a main subtree and an associated special subtree in accordance with the illustrative embodiments. Directory tree 400 comprises main subtree o=ibm,c=us 402, which includes main subtree entries cn=John 404 and cn=Joe 406. In this illustrative example, a modification is made to the main subtree entry cn=Joe,o=ibm,c=us. When the change is made, the directory server that contains main subtree entry cn=Joe, o=ibm,c=us creates special subtree entry changenumber=1 408 in the cn=changelog 410 subtree. The distinguished name for the special subtree entry is changenumber=1, cn=changelog. When the directory server creates the special subtree entry, the directory server also assigns the target distinguished name to the special subtree entry based on the target for the update request. The targetDN in this example is cn=joe,o=ibm,c=us. The targetDN reflects the target entry to which the update applied.

Figure 5:
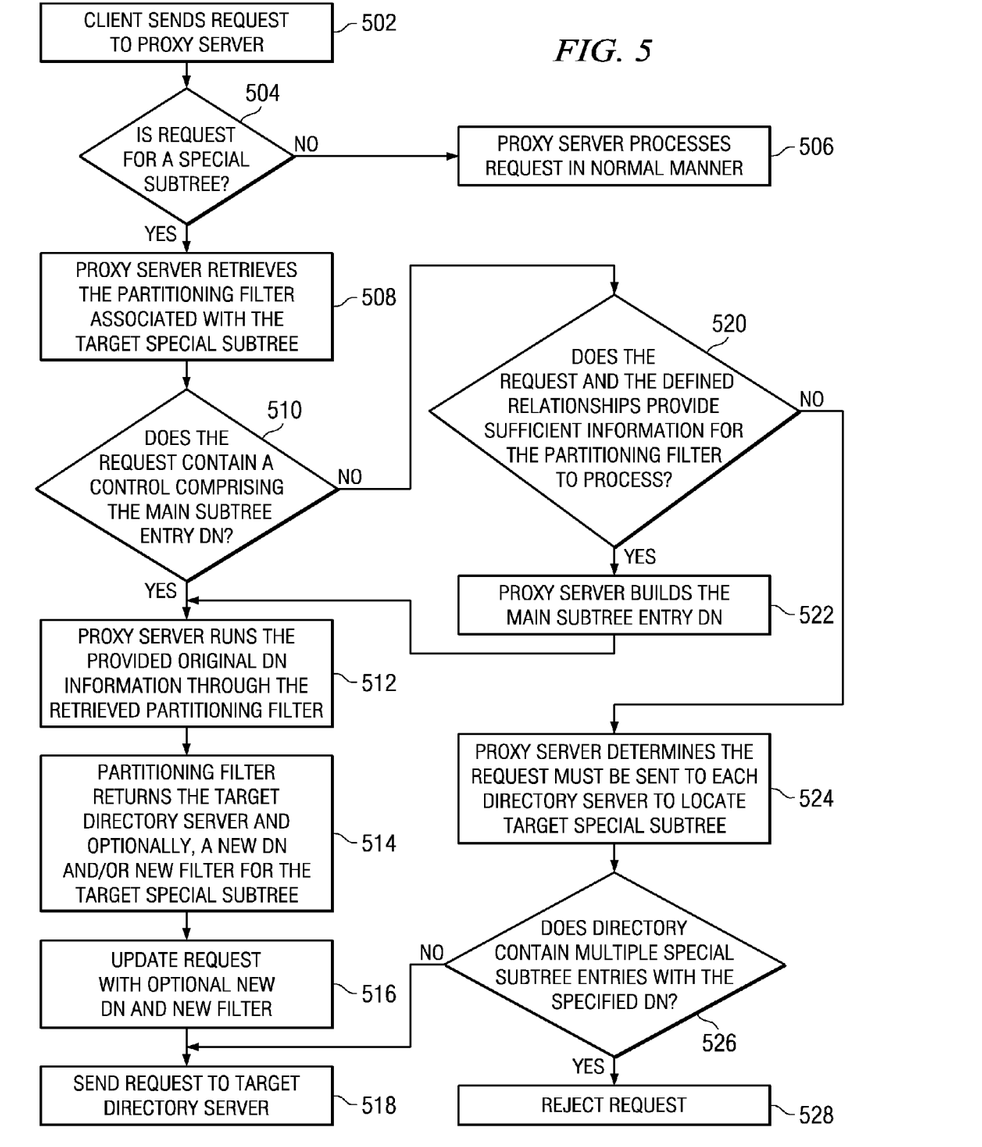
FIG. 5 illustrates a flowchart of a process for providing proxy support for special subtree entries in accordance with the illustrative embodiments.

FIG. 5 illustrates a flowchart of a process for providing proxy support for special subtree entries in accordance with the illustrative embodiments. The process described in FIG. 5 may be implemented using a proxy server in a distributed directory environment such as depicted in FIG. 3.

The process begins when a client sends a request to the proxy server to access data stored in the distributed directory (step 502). This request may comprise a search request, an update request, or the like. The proxy server determines whether the request requests a special subtree entry in the distributed directory (step 504). If the proxy server determines that the request is not a request for a special subtree entry ('no' output of step 504), the proxy server processes the request as a standard directory server request (step 506).

However, if the proxy server determines that the request is a request for a special subtree entry ('yes' output of step 504), the proxy server retrieves the partitioning filter associated with the special subtree (step 508). The partitioning filter may comprise a hash function that is used to distribute data across the set of directory servers based on the hash value of the relative distinguished names at one level of the entry's distinguished name. The proxy server then determines if a distinguished name control is included in the client request (step 510). The control comprises the distinguished name of the main subtree entry associated with the target special subtree entry.

If the request includes the control ('yes' output of step 510), the proxy server runs the distinguished name information provided in the control through the retrieved partitioning filters (step 512). The partitioning filters return the target directory server associated with the distinguished name of the main subtree entry in the control to the proxy server and which contains the target special subtree (step 514). Partitioning filters may also return a new target distinguished name of the special subtree entry and/or a new search filter for the request to enable a directed search/retrieval of the requested special subtree entry from the target partition. If a new target distinguished name or a new search filter is returned, the proxy server then updates the request with the new target distinguished name of the special subtree entry and the new search filter to form a retrieval request (step 516). The retrieval request is then sent to the target directory server that contains the special subtree entry to retrieve the requested special subtree entry (step 518).

Turning back to step 510, if the request does not includes the control ('no' output of step 510), the proxy server makes a determination as to whether the information provided in the request and the relationship filters at the proxy server comprise sufficient information to enable the proxy server to build the distinguished name of the main subtree entry associated with the target special subtree entry (step 520). If the information provided in the request and the relationship filters comprise enough information to enable the proxy server to build the distinguished name of the main subtree entry associated with the target special subtree entry ('yes' output of step 520), the proxy server builds the distinguished name of the main subtree entry from the information provided in the request and the relationship filters (step 522). The process then continues to step 512 in which the proxy server runs the determined distinguished name through the partitioning function.

Turning back to step 520, if the proxy server determines that the information provided in the request and the relationship filters do not comprise enough information to enable the proxy server to build the distinguished name of the main subtree entry associated with the target special subtree entry ('no' output of step 520), the proxy server determines that the request must be processed in the traditional manner by sending the request to all of the directory servers in the distributed directory in order to locate the target special subtree (step 524).

There are some situations in which a distinguished name may exist in multiple partitions or directory servers in the distributed environment. These situations may occur as individual backend directory servers keep their own internal count for the next change number. As each server starts at 1 and increments, there is no uniqueness guarantee for special subtree entries across a distributed directory environment. Thus, a special subtree entry (e.g., changenumber=1, cn=changelog) may exist in multiple directory servers which reflect the individual modifications made to each main subtree entry in different directory servers. The proxy server makes a determination as to whether there are multiple directory servers that contain special subtree entries with the specified distinguished name (step 526). This determination may be made by issuing requests to each of the backend servers to determine if multiple entries on the backend servers exist. If there are multiple directory servers that contain special subtree entries matching the specified distinguished name ('yes' output of step 526), the proxy server rejects the request as a complete resolution cannot be determined, with the process terminating thereafter. However, if only one directory server contains an entry for the special subtree ('no' output of step 526), the process then continues to step 518 in which the proxy server sends the request to the target directory server to retrieve the requested special subtree.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the embodiments of the disclosure in the forms disclosed. Many modifications and variations will be apparent to those of ordinary skill in the art without departing from the scope and spirit of the disclosure. The embodiments wer chosen and described in order to best explain the principles of the disclosure and the practical application, and to enable others of ordinary skill in the art to understand the disclosure for various embodiments with various modifications as are suited to the particular use contemplated.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact-diskread/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments of the disclosure has been presented for purposes of illustration and description, and is not intended to be exhaustive or limited to the embodiments of the disclosure in the forms disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

What is claimed is:

1. A computer implemented method of locating special subtree entries in a distributed directory environment using a proxy server, the computer implemented method comprising:
   receiving, at the proxy server, a request from a client for a special subtree entry, wherein the special subtree entry is stored in a special subtree in one of a plurality of backend directory servers in the distributed directory environment;

retrieving by the proxy server a partitioning filter associated with the requested special subtree entry;

determining whether the request comprises a distinguished name control, wherein the control specifies the distinguished name of a main subtree entry associated with the special subtree entry;

responsive to a determination that the request does not comprise a distinguished name control, building the distinguished name of the main subtree entry associated with the special subtree entry;

applying the partitioning filter to the distinguished name of the main subtree entry to determine a target directory server in the plurality of backend directory servers that comprise the special subtree; and sending the request to the target directory server, wherein the special subtree entries comprise directory entries that represent changes made to entries in main subtrees.

2. The computer implemented method of claim 1, further comprising:

determining at least one of a new distinguished name for the special subtree entry or a new search filter for the request;

updating the request with the at least one new distinguished name or new search filter to form a directed search, wherein the directed search retrieves the special subtree entry from the target directory server; and sending the directed search to the target directory server.

3. The computer implemented method of claim 1, further comprising:

responsive to a determination that the request comprises a distinguished name control, obtaining the distinguished name of the main subtree entry from the distinguished name control;

applying the partitioning filter to the distinguished name of the main subtree entry to determine a target directory server in the plurality of backend directory servers that comprises the special subtree; and sending the request to the target directory server.

4. The computer implemented method of claim 1, wherein building the distinguished name of the main subtree entry associated with the special subtree entry comprises:

determining whether the distinguished name of the main subtree entry can be built using information in the request and pre-defined relationships between the main subtree entry and the requested special subtree entry; and building the distinguished name of the main subtree entry associated with the special subtree entry in response to a determination that the distinguished name of the main subtree entry can be built.

5. The computer implemented method of claim 4, further comprising:

sending the request to all directory servers in the plurality of backend directory servers in response to a determination that the distinguished name of the main subtree entry cannot be built.

6. The computer implemented method of claim 5, further comprising:

determining whether multiple identical entries with the distinguished name of the special subtree entry exist in the plurality of backend directory servers; and responsive to a determination that multiple identical entries exist, rejecting the request.

7. The computer implemented method of claim 6, further comprising:

responsive to a determination that multiple copies do not exist, identifying a directory server that contains the special subtree entry as the target directory server; and sending the request to the target directory server.

8. The computer implemented method of claim 1, wherein applying the partitioning filter to the original distinguished name further comprises:

applying a hash function to relative distinguished names at a level of the distinguished name of the main subtree entry; and obtaining a result of the hash function, wherein the result indicates the target directory server that comprises the requested special subtree entry.

9. The computer implemented method of claim 4, wherein the pre-defined relationships between the main subtree entry and the requested special subtree entry comprise relationships between the distinguished name of the main subtree entry and the distinguished name of the special subtree entry or between the distinguished name of the main subtree entry and an attribute of the special subtree entry.

10. The computer implemented method of claim 1, wherein the special subtree entry is one of a changelog subtree entry or tombstone subtree entry.

11. An apparatus comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to receive, at the proxy server, a request from a client for a special subtree entry, wherein the special subtree entry is stored in a special subtree in one of a plurality of backend directory servers in the distributed directory environment; retrieve by the proxy server a partitioning filter associated with the requested special subtree entry; determine whether the request comprises a distinguished name control, wherein the control specifies the distinguished name of a main subtree entry associated with the special subtree entry; build, in response to a determination that the request does not comprise a distinguished name control, the distinguished name of the main subtree entry associated with the special subtree entry; apply the partitioning filter to the distinguished name of the main subtree entry to determine a target directory server in the plurality of backend directory servers that comprise the special subtree; and send the request to the target directory server, wherein the special subtree entries comprise directory entries that represent changes made to entries in main subtrees.

12. A tangible computer usable storage device comprising a computer program product having computer usable program code stored thereon, the computer usable program code for execution by a computer, comprising:

computer usable program code for receiving, at the proxy server, a request from a client for a special subtree entry, wherein the special subtree entry is stored in a special subtree in one of a plurality of backend directory servers in the distributed directory environment;

computer usable program code for retrieving by the proxy server a partitioning filter associated with the requested special subtree entry;

computer usable program code for determining whether the request comprises a distinguished name control, wherein the control specifies the distinguished name of a main subtree entry associated with the special subtree entry;

computer usable program code for building, in response to a determination that the request does not comprise a distinguished name control, the distinguished name of the main subtree entry associated with the special subtree entry;

computer usable program code for applying the partitioning filter to the distinguished name of the main subtree entry to determine a target directory server in the plurality of backend directory servers that comprise the special subtree; and computer usable program code for sending the request to the target directory server, wherein the special subtree entries comprise directory entries that represent changes made to entries in main subtrees.

13. The tangible computer usable storage device comprising a computer program product of claim 12, further comprising:

computer usable program code for determining at least one of a new distinguished name for the special subtree entry or a new search filter for the request;

computer usable program code for updating the request with the at least one new distinguished name or new search filter to form a directed search, wherein the directed search retrieves the special subtree entry from the target directory server; and computer usable program code for sending the directed search to the target directory server.

14. The tangible computer usable storage device comprising the computer program product of claim 12, further comprising:

computer usable program code for obtaining, in response to a determination that the request comprises a distinguished name control, the distinguished name of the main subtree entry from the distinguished name control;

computer usable program code for applying the partitioning filter to the distinguished name of the main subtree entry to determine a target directory server in the plurality of backend directory servers that comprises the special subtree; and computer usable program code for sending the request to the target directory server.

15. The tangible computer usable storage device comprising the computer program product of claim 12, further comprising:

computer usable program code for determining whether the distinguished name of the main subtree entry can be built using information in the request and pre-defined relationships between the main subtree entry and the requested special subtree entry; and computer usable program code for building the distinguished name of the main subtree entry associated with the special subtree entry in response to a determination that the distinguished name of the main subtree entry can be built.

16. The tangible computer usable storage device comprising the computer program product of claim 15, further comprising:

computer usable program code for sending the request to all directory servers in the plurality of backend directory servers in response to a determination that the distinguished name of the main subtree entry cannot be built.

17. The tangible computer usable storage device comprising the computer program product of claim 16, further comprising:

computer usable program code for determining whether multiple identical entries with the distinguished name of the special subtree entry exist in the plurality of backend directory servers; and computer usable program code for rejecting the request in response to a determination that multiple identical entries exist.

18. The tangible computer usable storage device comprising the computer program product of claim 12, wherein the computer usable program code for applying the partitioning filter to the original distinguished name further comprises:

computer usable program code for applying a hash function to relative distinguished names at a level of the distinguished name of the main subtree entry; and computer usable program code for obtaining a result of the hash function, wherein the result indicates the target directory server that comprises the requested special subtree entry.

19. The tangible computer usable storage device comprising the computer program product of claim 12, wherein the computer usable program code is stored in a computer readable storage medium in a data processing system, and wherein the computer usable program code is downloaded over a network from a remote data processing system.

20. The tangible computer usable storage device comprising the computer program product of claim 12, wherein the computer usable program code is stored in a computer readable storage medium in a server data processing system, and wherein the computer usable program code is downloaded over a network from a remote data processing system for use in a computer readable storage medium with the remote system.

* * * * *